United States Patent [19]
Harris

[11] Patent Number: 5,833,564
[45] Date of Patent: Nov. 10, 1998

[54] VARIABLE TRANSMISSION APPARATUS

[76] Inventor: Michael Alan Harris, 27 Eastgate St., North Elmham, Norfolk NR20 5AB, England

[21] Appl. No.: 874,096

[22] Filed: Jun. 12, 1997

[30] Foreign Application Priority Data

Jun. 12, 1996 [GB] United Kingdom .................... 9612231

[51] Int. Cl.$^6$ .................................................... H02K 7/116
[52] U.S. Cl. ............................................................ 475/149
[58] Field of Search ............................ 475/149; 310/103, 310/112, 113, 114

[56] References Cited

U.S. PATENT DOCUMENTS

| | | | |
|---|---|---|---|
| 1,298,375 | 3/1919 | Neuland | 310/103 |
| 4,694,187 | 9/1987 | Baker | 310/112 |
| 4,757,728 | 7/1988 | Pitsch | 475/149 |
| 4,785,688 | 11/1988 | Shiozaki et al. | 475/149 |
| 5,508,574 | 4/1996 | Vlock | 310/113 |
| 5,704,864 | 1/1998 | Yanagisawa | 475/149 |
| 5,708,314 | 1/1998 | Law | 310/112 |
| 5,711,736 | 1/1998 | Kyodo | 475/149 |

*Primary Examiner*—Dirk Wright
*Attorney, Agent, or Firm*—Lee, Mann, Smith, McWilliams, Sweeney & Ohlson

[57] ABSTRACT

A variable transmission mechanism, particularly for the automatic transmission of a vehicle, comprises a driven rotor (22) having windings to which a variable DC supply is fed, and an armature rotor (10) in electromagnetic cooperation with the driven rotor. The rotors are connected to an epicyclic gear train (14) which is also connected to an output shaft, the arrangement being such that an increase in power supply to the driven rotor increases the torque between the rotors and enables the speed of the output shaft to be increased.

14 Claims, 9 Drawing Sheets

VARIABLE TRANSMISSION APPARATUS

FIELD OF INVENTION

This invention relates to variable transmission apparatus, sometimes inaccurately referred to as infinitely variable transmission, and is particularly though not exclusively concerned with automatic transmission for vehicles.

BACKGROUND TO THE INVENTION

Automatic transmission on motor vehicles has become popular in many sectors of the automobile industry, particularly on large motor cars and ones used predominantly in urban driving situations. However a major disadvantage of conventional automatic transmission is the low efficiency achievable in comparison with manual transmission; for example the efficiency of a fixed ratio gearing may typically be of the order of 98%. Additionally, conventional automatic transmission is more costly to produce and to maintain.

In UK patient specification GB337464 there is described a variable speed gear having a pair of concentric rotors. A variable power is applied to the outer rotor so that the rotors are coupled by a magnetic flux. No facility is disclosed for generating power due to slippage between the rotors.

It is an object of the present invention to provide an improved variable transmission apparatus which is of relatively simple construction, and which preferably enables power to be generated that would otherwise be wasted.

SUMMARY OF THE INVENTION

According to the present invention there is provided variable transmission apparatus comprising a drive shaft and an output shaft, a first rotor connected to the drive shaft and incorporating an armature, a second rotor having windings to which an adjustable power supply is connectable, the first and second rotors being in electromagnetic cooperation, and gear means mechanically connecting the first and second rotors in such a manner that when in use power is supplied to the second rotor, the resulting torque between the rotors is transmitted to the output shaft, whereby increasing the power supplied to the second rotor increases said torque and enables the speed of the output shaft to be increased.

Preferably the first rotor is of annular construction and the second rotor is mounted for rotation within the first rotor.

Advantageously the gear means is an epicyclic gear train comprising annulus, sun and planet gears, the latter being mounted on a planet carrier. In this case the first and second rotors are preferably connected respectively to the annulus and sun gears, while the output shaft is connected to the planet carrier.

The armature of the first rotor preferably incorporates a plurality of axial slots in which are mounted squirrel cage type members. Additionally the slots may be provided with a 3-phase winding connectable to a slip ring assembly, whereby electrical power generated by slippage between the rotors may be drawn off and utilised.

Such power may be used either for ancillary purposes, eg to supply additional power to the second rotor, or may be stored, eg to charge a battery.

The first rotor is preferably provided with axially extending ventilation passages from which tubes may extend outwardly from the ends of the passages to thereby form a centrifugal fan for drawing cooling air through the passages.

The second rotor may have alternator type windings and may be formed with a plurality of pairs of poles, in particular three pairs.

The adjustable power supply may be a DC supply connectable by a pair of slip rings to the second rotor.

BRIEF DESCRIPTION OF THE DRAWINGS

Embodiments of variable transmission apparatus in accordance with the invention will now be described with reference to the accompanying drawings, in which.

DETAILED DESCRIPTION

Figure 1:
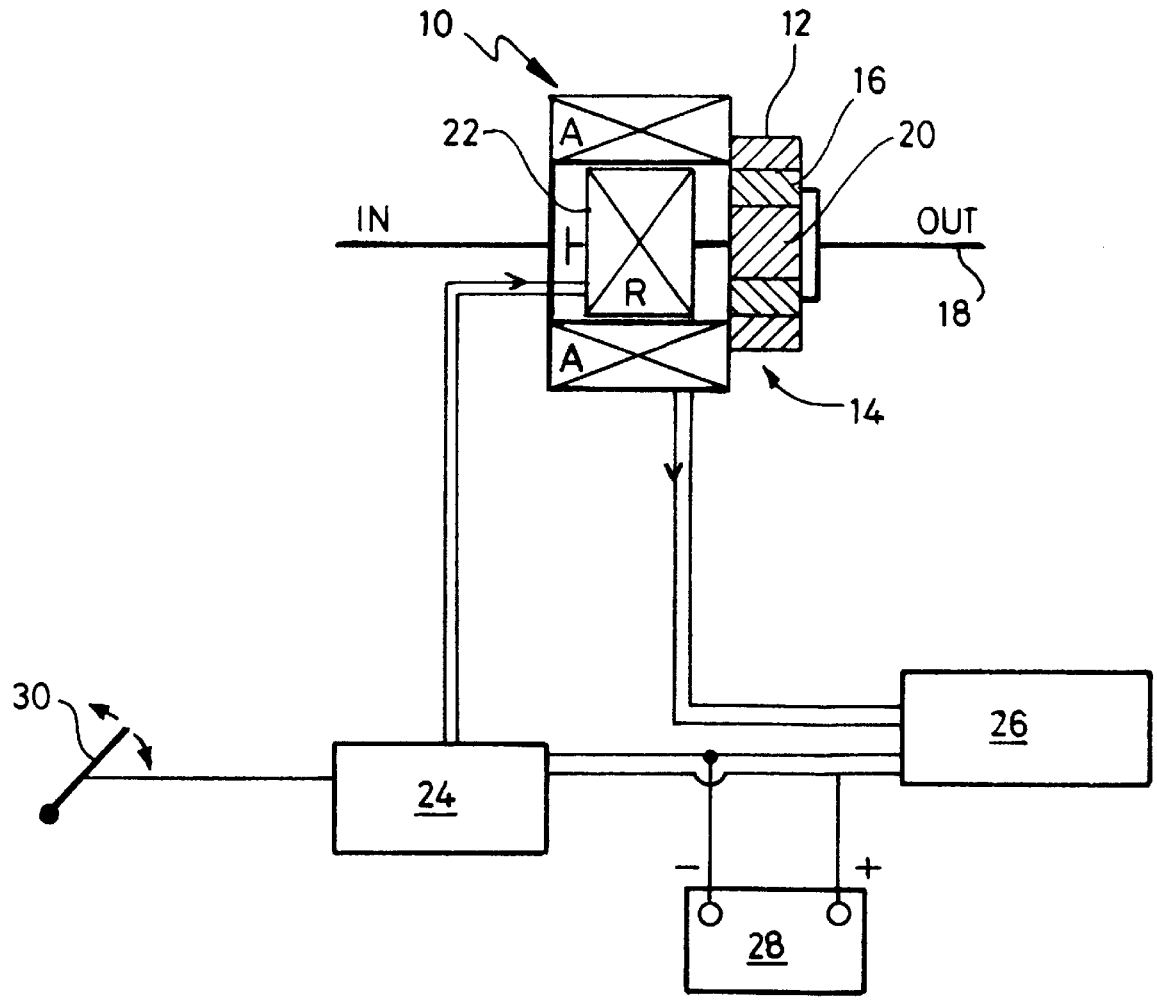
FIG. 1 is a schematic layout of a first embodiment of the apparatus as applied to a motor vehicle.

Referring first to FIG. 1, there is shown generally at 10 an armature rotor to which a drive is applied. The rotor 10 is mechanically coupled to an annulus gear 12 of an epicyclic gear train 14, of which the planet gears 16 are connected by planet carrier arms to an output shaft 18. The sun gear 20 is coupled to a six pole rotor 22 which is freely rotatable within the armature rotor 10.

An adjustable power supply 24 applies a DC voltage to the inner rotor 22, while an electronic control circuit 26 taps off any AC power generated in the outer rotor 10. After rectification of the AC power, the resultant power is delivered (depending on the conditions of the variable transmission) partly to the DC supply 24 and partly to storage in the form of a battery 28.

Control of the power supply 24 is effected by a lever 30 which, in this embodiment, will be connected to, or form part of, the accelerator pedal of the vehicle on which the transmission is mounted.

Having described the main elements of the apparatus, reference will now be made to the more detailed view of the transmission shown in FIGS. 2 and 3.

Figure 2:
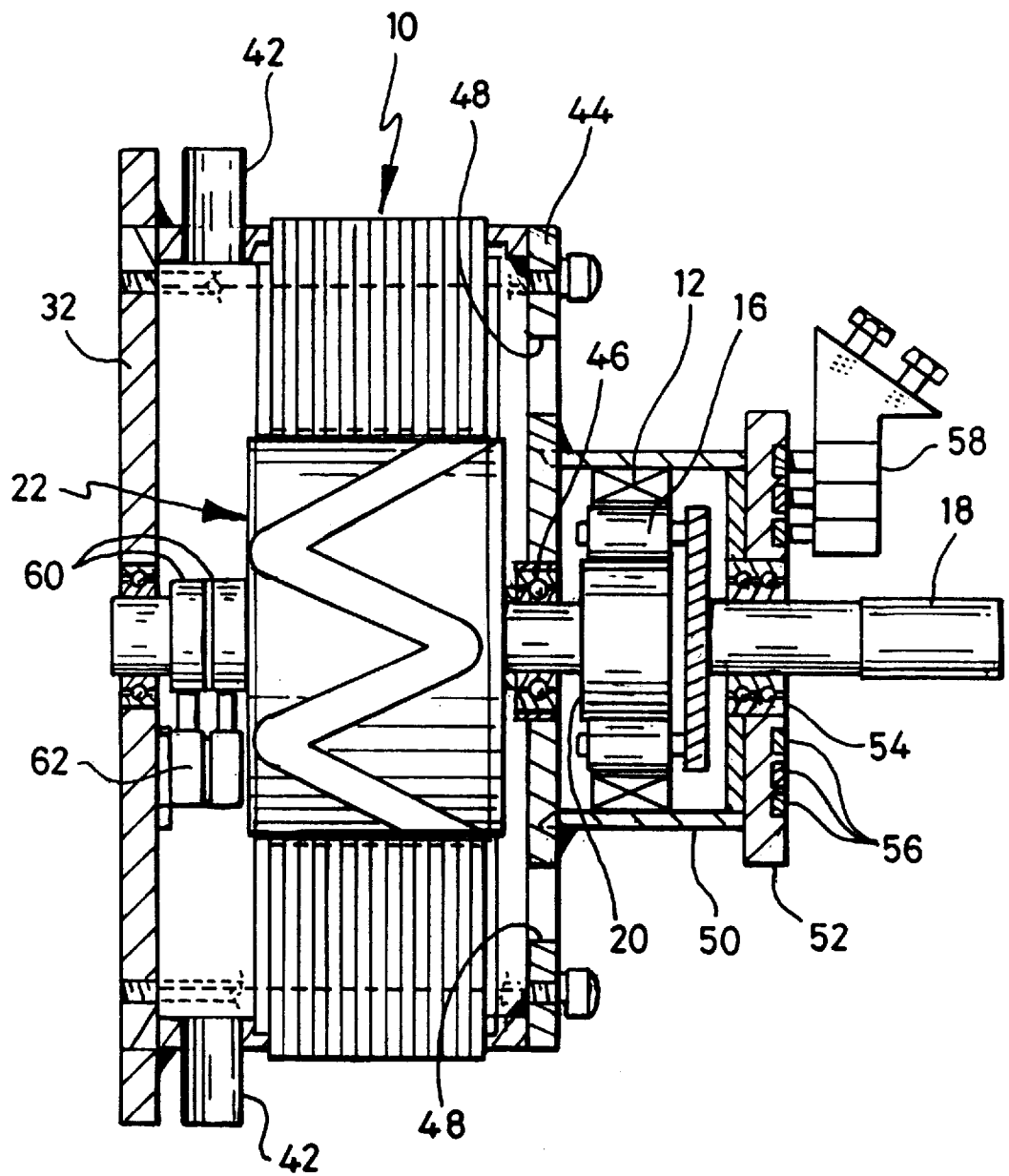
FIG. 2 is a side view in section of an epicyclic gear train and rotors forming the main elements of the transmission.

The whole of the unit of FIG. 2 is enclosed in a bell housing (not shown). Drive to the armature rotor 10 is taken directly from the output shaft of the engine, without passing through a clutch, and is transmitted to a driven plate 32 connected to the rotor 10.

Figure 3:
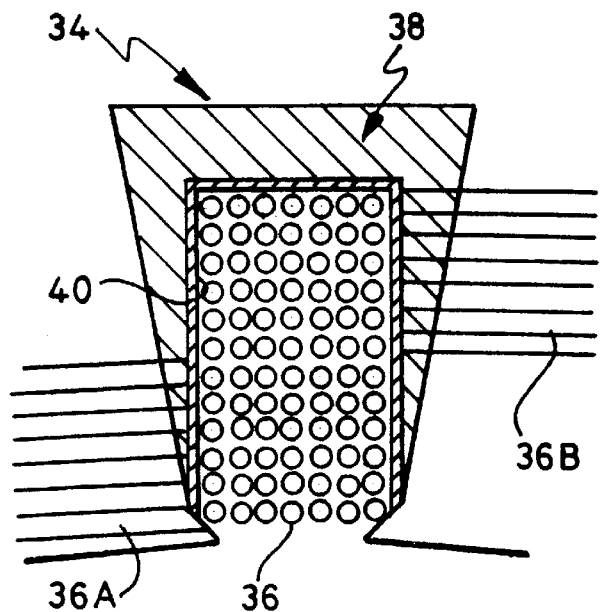
FIG. 3 is an enlarged sectional detail in end view of one slot in the armature rotor.

The rotor 10 comprises a laminated armature having thirty-six slots 34, one of which is shown enlarged in FIG. 3. The slot is of dovetailed section, being narrower at its inner opening than at its radially outer base. A rectangular section of each slot 34 contains a three-phase power output winding 36, while the remainder of the slot contains hollow copper tubes 38 of the squirrel-cage type, being connected in parallel and short-circuited at their ends. At 36A and 36B are shown one of the 3-phase wiring looms. An insulation sleeve 40 separates the windings 36 from the tubes 38.

Passing axially between the slots 34 are formed ventilation passages (not shown) through which filtered cooling air can be drawn and expelled through radial outlet tubes 42, which act as a centrifugal fan.

Secured to the right of the rotor 10 is a cylindrical end plate 44 having a ball bearing 46 in which the right hand side of the rotor 22 (as viewed in FIG. 2) is rotatably mounted, air holes 48 being formed in the plate 44 to admit cooling air. The left hand side of the rotor 22 is similarly mounted in a bearing which is fitted in driven plate 32. Secured to the end plate 44 is a gearbox casing 50 on the inside of which is mounted the annulus gear 12 of the epicyclic gear train. The casing 50 is totally enclosed so that it can contain a small quantity of light lubricating oil, and it includes a supporting disc 52 carrying a ball bearing 54 in which the output shaft 18 is rotatably mounted. The disc is provided with three concentric slip rings 56 made of copper and insulated from the disc. A set of brushes 58 is in electrical contact with the slip rings 56, which are connected by wires (not shown) to a three-phase bridge rectifier (not shown) which is mounted on plate 44 so that it is cooled by the filtered airflow before the air passes through the rotor 10. The power is delivered to the battery 28 by a circuit which may be similar to the one to be described beow with reference to FIG. 8.

At the left-hand side of the six pole rotor 22 are similarly formed a pair of adjacent slip rings 60, in contact with a corresponding pair of brushes 62. The power source 24 includes an integrated circuit pulse width modulation (PWM) chip which drives a PNP power transistor mounted on a heat sink, which is also cooled by the airflow. The PWM chip operates typically at a frequency of 10 kHz and is capable of operating at pulse to space ratios of from 1:50 to 50:1. Control of the PWM chip is by a potentiometer or a control voltage derived from a source such as a tachometer, frequency filter or over-temperature sensor. This may be applied via the control lever 30.

Operation

Assuming that the engine is operating at an idling speed of say 1000 RPM with the output shaft 18 stationary, if no power is supplied by the DC source 24 to the windings of the six pole rotor 22 (via brushes 62 and slip-rings 60) then no magnetic coupling takes place. Thus the planet gears 16 are rotated but remain bodily stationary so that the armature rotor 10 drives the rotor 22 at about twice its speed in the opposite direction, resulting in a relative speed difference of about 3000 RPM. In this condition no torque is transmitted to the output shaft 18.

Upon supplying a small amount of DC power from the source 24 to the rotor 22, a magnetic coupling torque will be created between the two rotors, the squirrel-cage tubes 38 being heated by the resulting eddy currents which are thereby generated. In consequence the speed of the rotor 22 will tend to reduce, causing rotation of the output shaft 18 at a progressively increasing speed. By increasing the PWM ratio the magnetic coupling can be proportionately increased, until the slippage between the rotors reduces to zero. In this condition the transmission ratio is 1:1, with the shaft 18 rotating at engine speed and the epicyclic gear train 14 moving bodily without any meshing, so that negligeable friction or wear takes place. It should be noted that the whole unit of FIG. 2 is now rotating bodily in bearings (not shown).

When the output shaft 18 is running at below engine speed, due to slippage between the two rotors, power is generated in the three phase windings 36 and, after rectification in the on-board bridge rectifier, is passed through the brush set 58 to the control circuit 26 for utilisation. Thus the advantage of having the combined squirrel-cage and three phase winding on the armature rotor 10 is that losses produced during operation of the vehicle under varying conditions (eg load, gradient or headwind) can be used to charge the battery 28.

Additionally, when the engine is used for braking, the rotor 22 will be driven by the output shaft 18 at a greater speed than the speed of the armature rotor 10, so that power will again be generated for charging the battery, thereby producing regenerative braking. This presents the possibility of reducing the size of the conventional engine alternator, or maybe even eliminating the alternator altogether.

When it is desired to transmit an exceptionally high torque for a relatively short period of time (eg for short steep gradients at low speed) and full power is already supplied to the rotor 22, the three phase output can additionally be supplied for a short period to the rotor winding via a relay or a silicon controlled rectifier (S.C.R.). This action is self-stabilising, as the increased current in the windings will produce a reduction in slippage between the rotors, thereby reducing the three phase output.

The heated air from the tubes 42 may be utilised to heat the interior of the vehicle, thus eliminating the need for a conventional heater fan.

Reverse gear for the vehicle can be provided by having a mechanical or solenoid operated unit mounted in the differential output shaft of the vehicle. Thus the drive from the bevel output shaft can be applied to drive the half shafts either in a clockwise or counterclockwise direction, as is known per se.

Display of the engine speed can be provided by having a concentric RPM/speedometer dial with respective pointers, so that when the transmission ratio is 1:1 the two pointers will be in alignment.

If four-wheel drive is required, two units as described can be mounted back to back with a common central drive from the engine.

Second Embodiment

Figure 4:
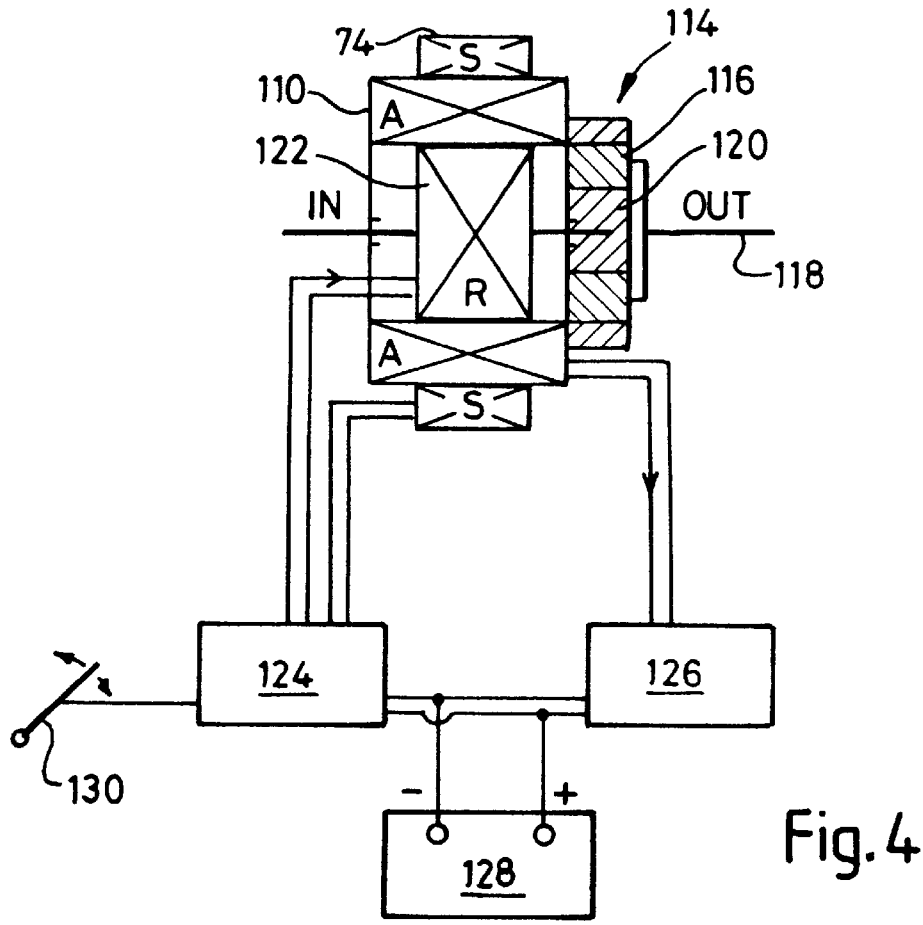
FIG. 4 is a modification of FIG. 1 showing schematically a second embodiment.
Figure 5:
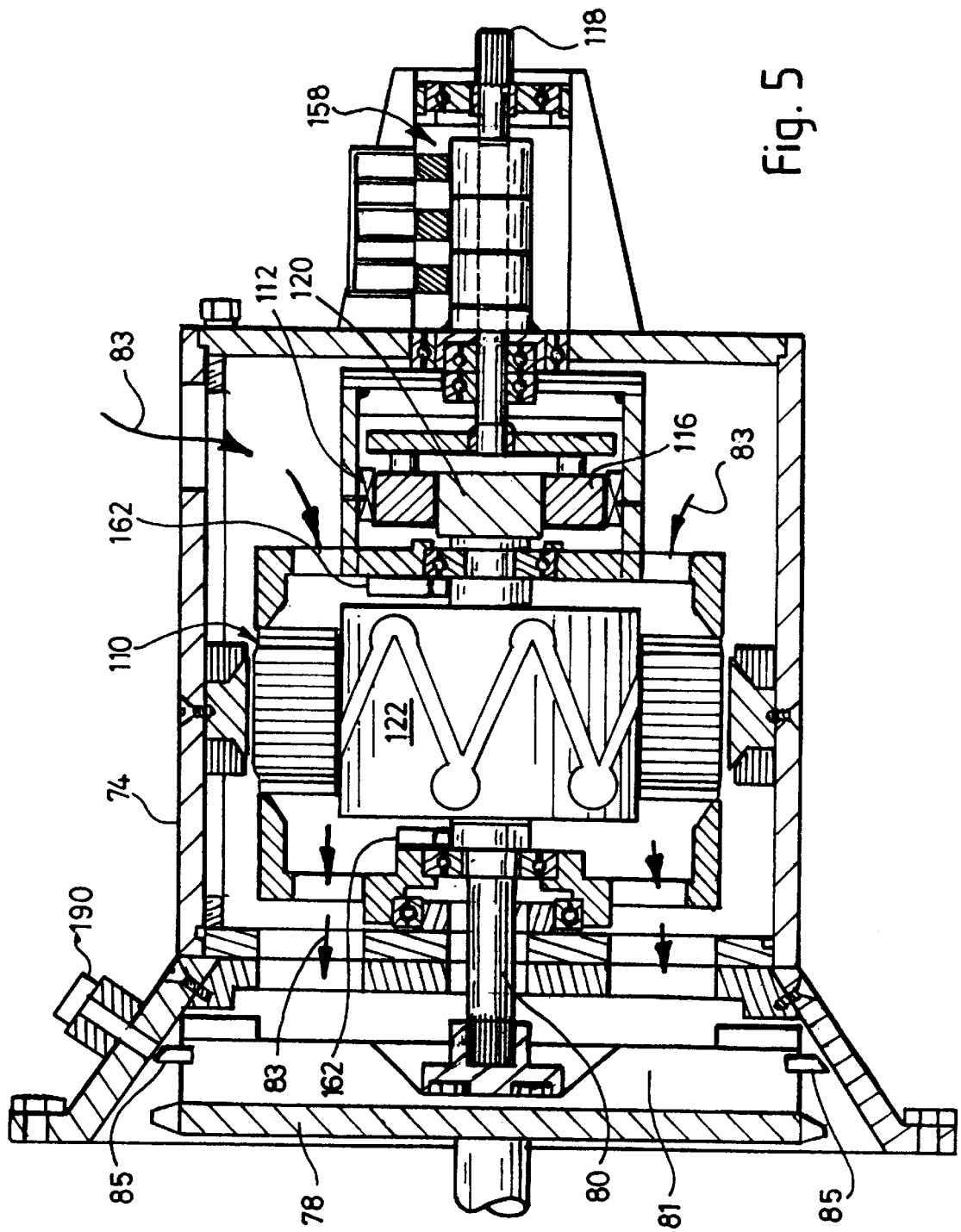
FIG. 5 is a longitudinal sectional view in detail of FIG. 4.

Reference will now be made to the modified apparatus shown in FIGS. 4 to 6, in which similar parts are denoted by the previous reference numerals but increased by 100.

Figure 6:
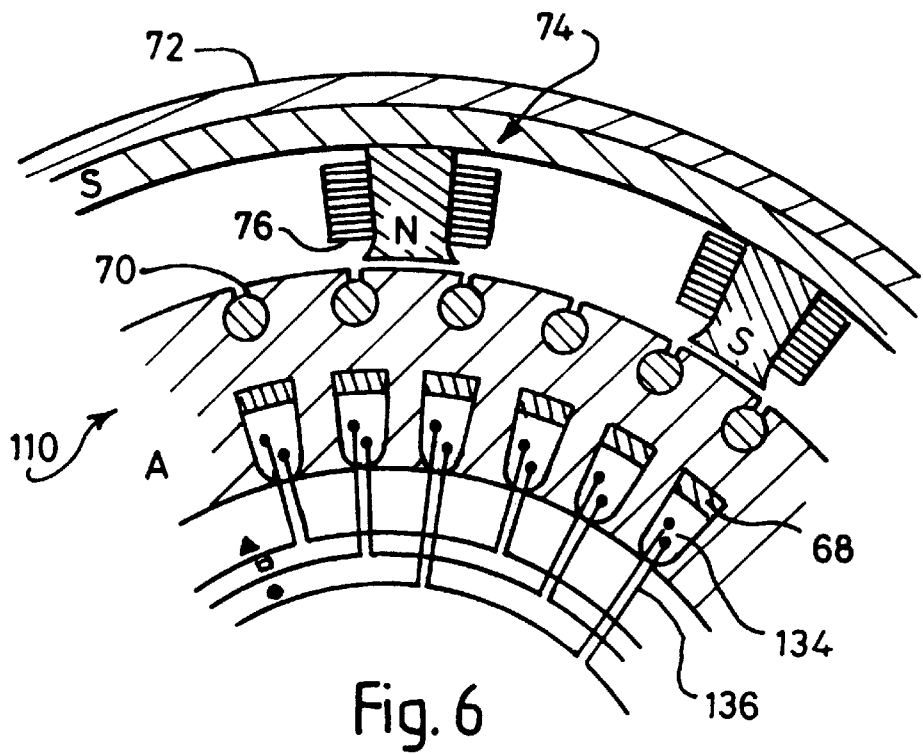
FIG. 6 is a partial cross-sectional view of the stator and rotor of FIG. 5.

The inner rotor 122 and epycyclic gear train 114 are similar to the previous parts, and the armature rotor 110 is again formed on its inner surface with thirty-six inwardly facing slots 134 (as shown in FIG. 6), and is made of a high torque laminated construction. The base of each slot is filled with a rectangular bar 68 which, as previously, is short-circuited at its ends. The remaining two-thirds of each slot contains the three-phase windings 136.

Formed on the outer surface of the rotor 110 are thirty-six slots 70 of keyhole section. Each slot contains a cylindrical copper rod which is shortened at its ends by respective rings (not shown). Secured to the fixed bell housing 72 is a stator ring 74 made of steel and formed on the inside with twelve pole pieces 76, each wound with a coil of insulated copper wire so as to produce alternate north and south poles as indicated. The inner faces of the pole pieces are spaced from the surface of the rotor 110 so as to produce a good electromagnetic coupling with the copper rods in the slots 70.

In this case the engine is connected through a flywheel 78 (see FIG. 5) and shaft 80 to the inner rotor 122, which is coupled to the sun gear 120, while the armature rotor 110 is coupled to the annulus gear 120 but is otherwise free to rotate. The output shaft 118 is again connected by the carrier arms to the planet gears 116.

Mounted to the rear of the flywheel 78 is an impellor 81 which draws cooling air, as previously, past the rotors 110 and 122, as shown by the arrows 83. The impellor carries two oppositely disposed metal studs 85 which rotate past a tacho-generator 190 to indicate engine speed.

In operation, when the output shaft 118 is stationary and the rotor 122 is rotated by the engine with no DC power applied, the armature rotor 110 will rotate freely in the opposite sense at half the speed, assuming again that the diameter of the sun gear is one-half of the diameter of the annulus gear. When drive is required, by depression of the accelerator pedal 130, the controller for the pulse width modulator (PWM) energises the pole pieces 76 to provide an electromagnetic coupling between the stator 74 and the armature rotor 110.

As the PWM ratio is increased, the speed of the rotor 110 is reduced by the coupling with the stator 74. The resulting reaction on the annulus gear 116 causes torque to be transmitted to the planet gears which in turn causes the output shaft to be rotated. A tachometer (not shown) senses the speed of the output shaft 118 and when that speed has increased to ⅓rd or more of the engine speed, as sensed by the tacho-generator, the controller disconnects the PWM output to the stator and instead applies DC power to the inner rotor 122. The resultant coupling between the rotors 110 and 122 enables transmission to the output shaft to continue in a second mode as in the first embodiment.

Where any slippage is caused in either mode of transmission, electrical power will be generated by the windings 134, eg recharging the battery 128.

Whereas the first transmission mode is equivalent to a conventional hydro-kinetic torque convertor, the second mode (as in the first embodiment) is equivalent to fluid flywheel transmission. In both modes of operation the apparatus is considered to be more flexible and efficient than conventional transmissions, especially in its ability to freewheel and to regenerate power.

Figure 7:
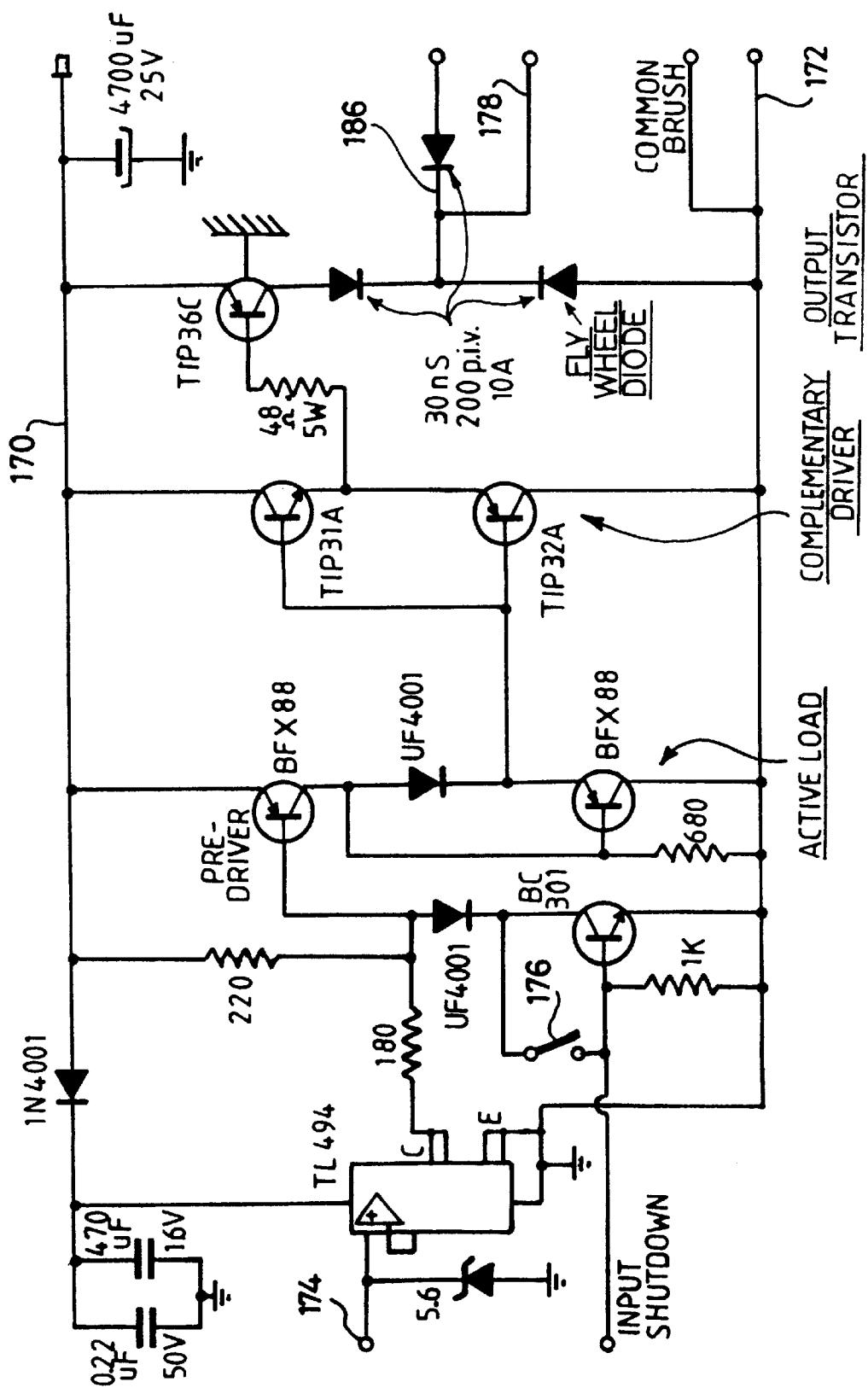
FIGS. 7 to 11 are circuit diagrams of the control arrangement.

Referring now to the various control circuits, in FIG. 7 a battery voltage of 10 to 14V is applied across the lines 170 and 172. At 174 is applied an input from a summing rail (see FIG. 10) which takes account of rotor speeds and pedal position. A voltage of 0 to 5V at 174 will produce 10 to 90% of battery voltage at the rotor brushes 162 of the inner rotor 122. Neutral switch 176 is normally in the open position during transmission. Terminal 178 is the output applied to the windings of the stator 74, or alternatively to the brushes 162 of the inner rotor 122.

Figure 8:
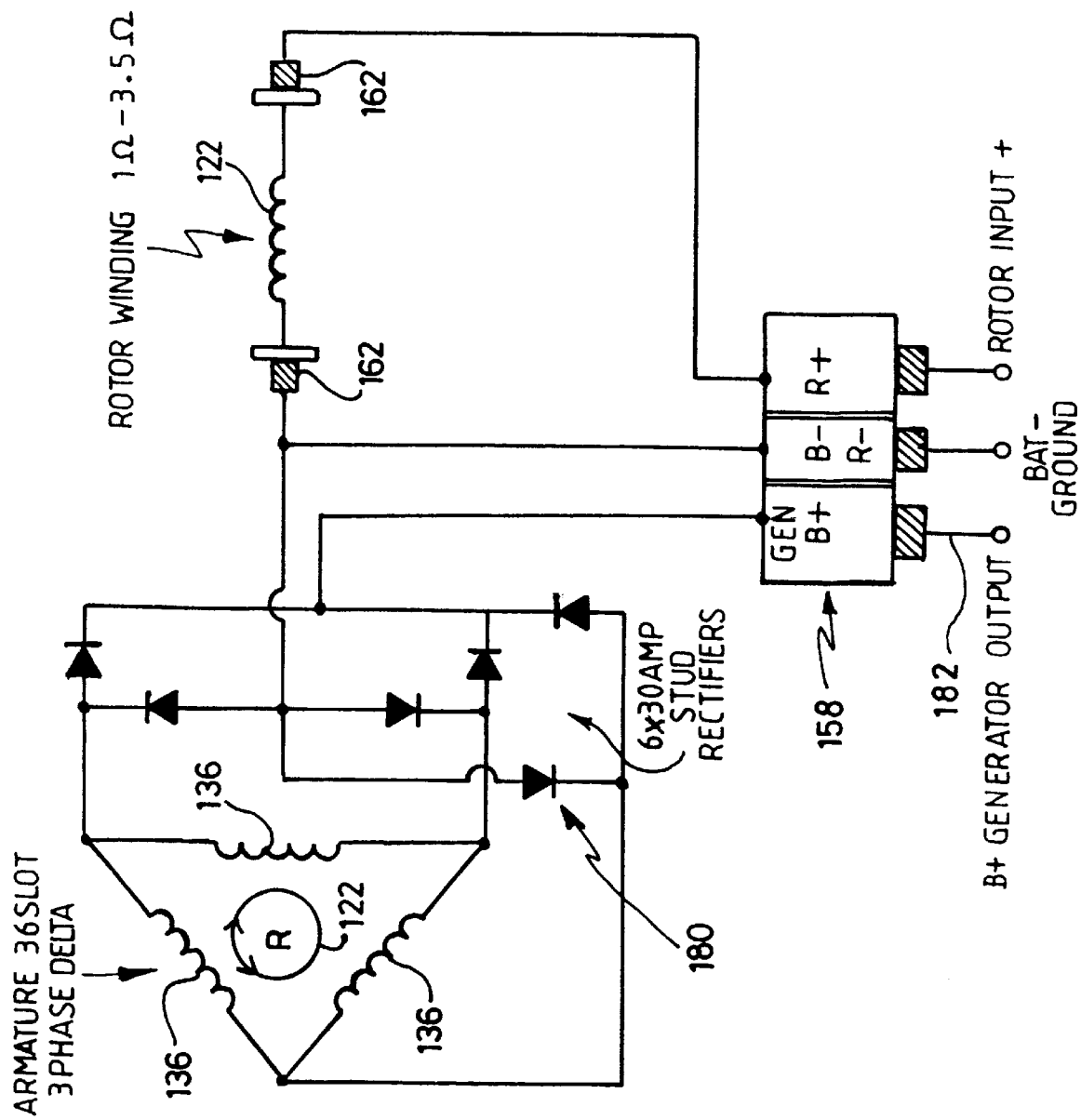

FIG. 8 shows the windings and connections for the rotor 122 and armature rotor 110. The armature windings 136 are connected in a 3-phase delta arrangement to a group of 30A diode rectifiers 180. One output goes to the generator segment 182 of the three sliprings 158, while the other end goes to one of the brushes 162 connected by a slipring to the windings of the rotor 122 and also to a second segment of the slipring connected to the earth of the battery 128. The third segment is connected to the other slipring and brush for the windings of the rotor 122.

Figure 9:
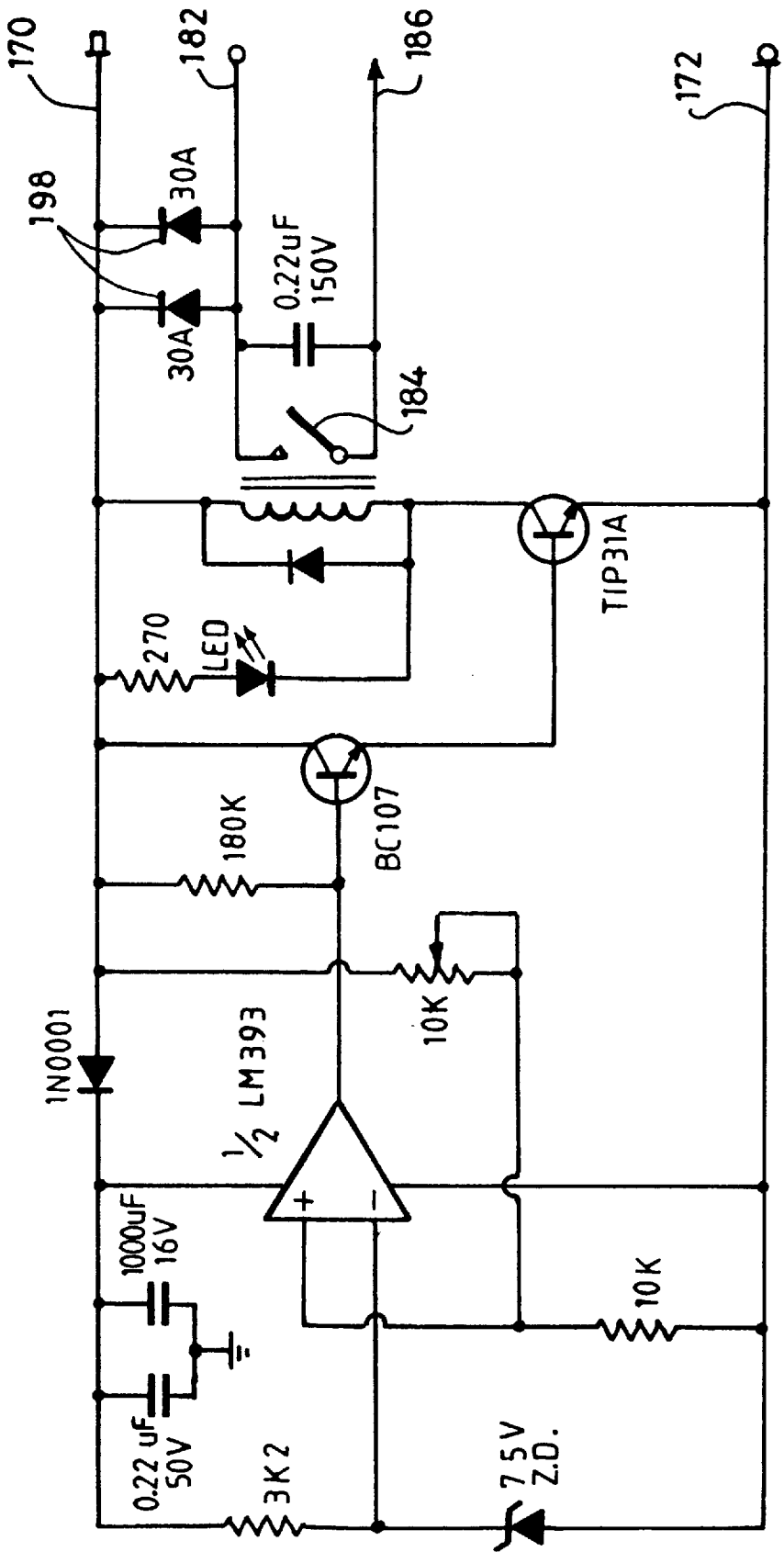

FIG. 9 shows the control unit for regenerative battery charging. Provided a switch 184 is made, the output 182 from the generator is applied to recharge the battery 128 (FIG. 1). The output at 186 is applied to the input 186 in FIG. 7.

Figure 10:
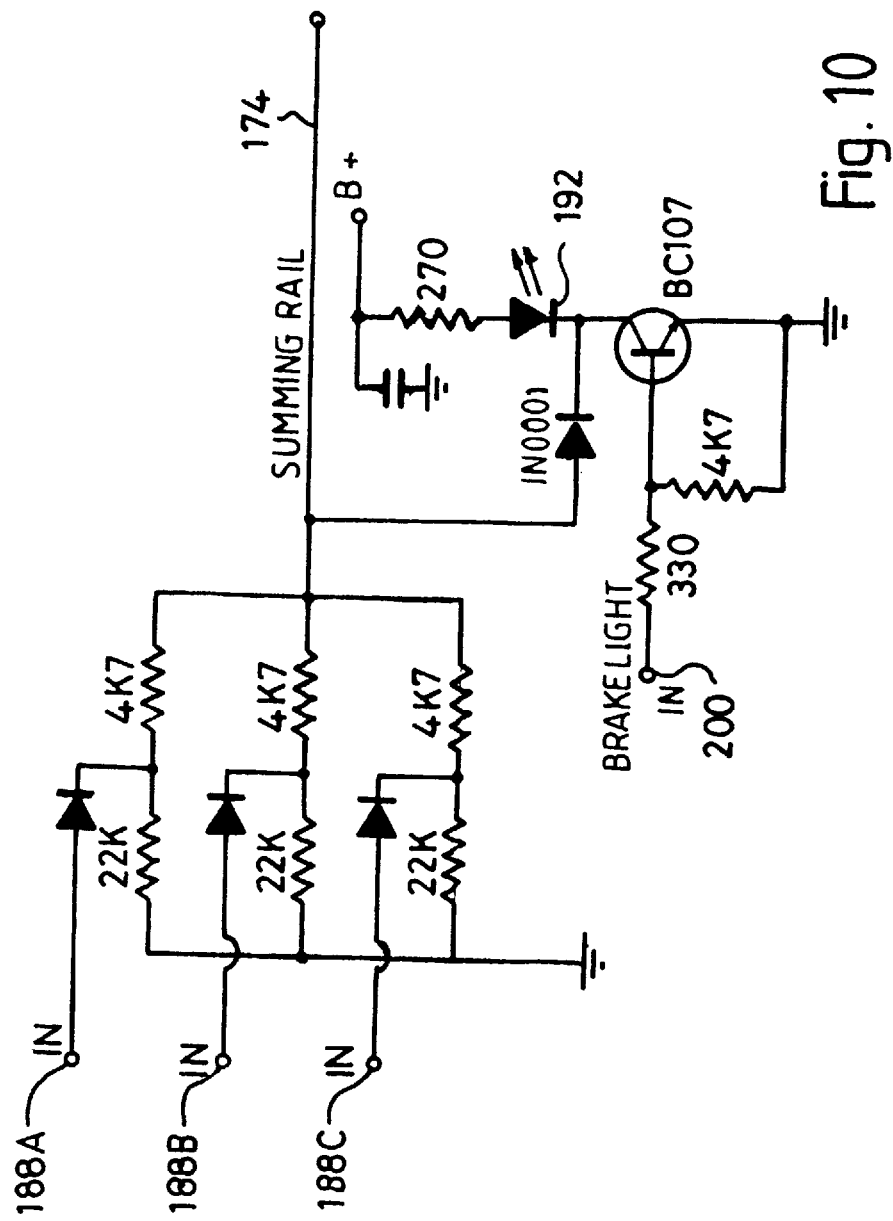

FIG. 10 shows the circuit for the summing rail. Inputs 188A to 188C are signals obtained respectively from the tacho-generator 190 (see FIG. 5) representing the engine speed, from a second tacho-generator (not shown) representing the shaft output speed, and from the position of the accelerator pedal 130. The resultant summing or averaging of these signals is fed as an output 174 to the circuit of FIG. 7. The signal is also applied to an LED 192, which serves as a brake-light monitor.

Figure 11:
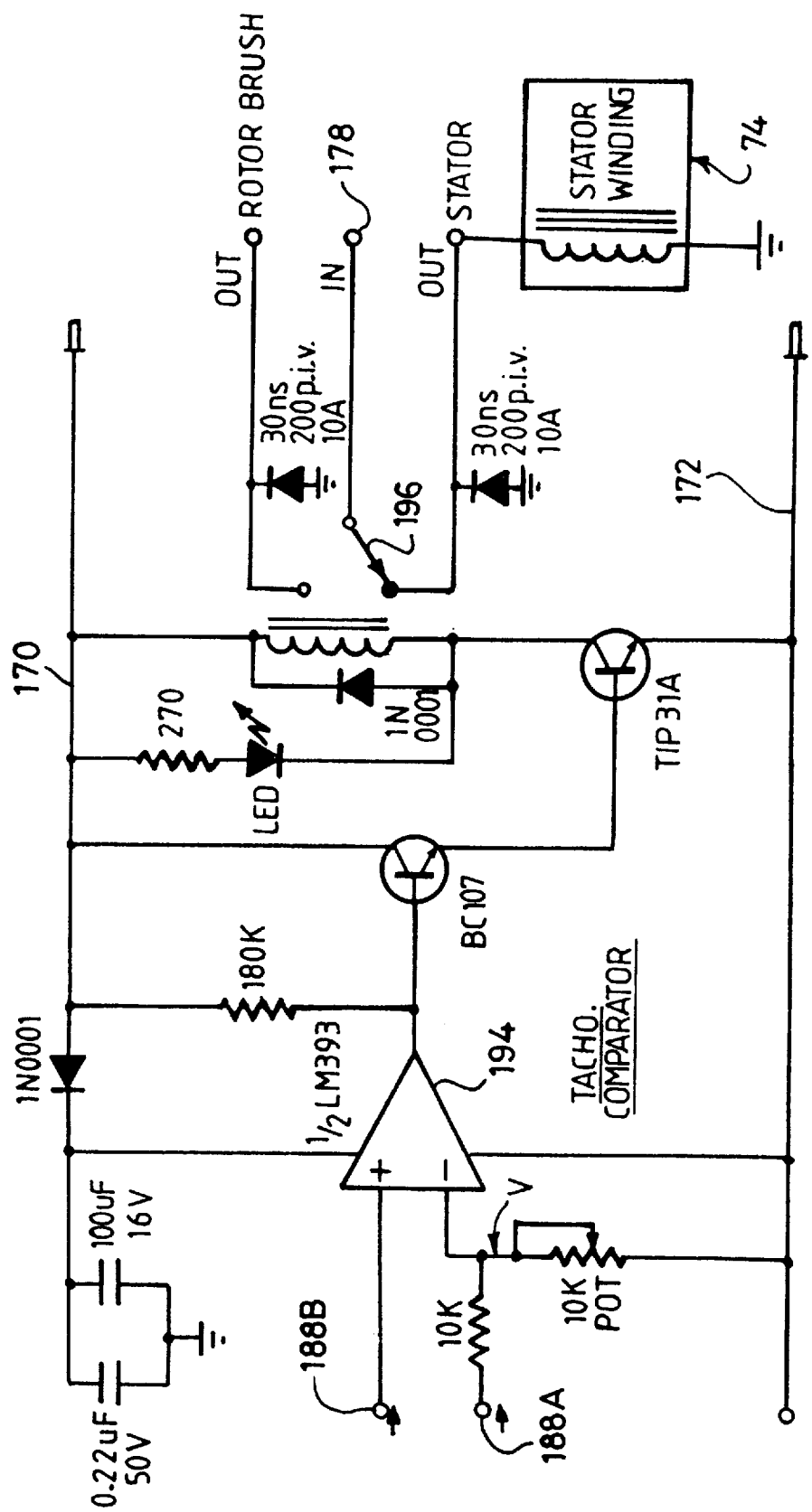

Referring finally to FIG. 11, this shows a circuit suitable for automatic operation of the stator control, being a modification of the circuit of FIG. 9. Here signals 180A and 180B are fed to a tacho-comparator. The output of the circuit operates on a relay 196 which feeds the PWM signals 178 either to the windings of the stator 74 or to the brushes of the inner rotor 122.

The operation of the apparatus in conjunction with the above circuits will now be described:

Transmission is commenced by opening the switch 176. The input voltage at 174 produces a small output at 178. At this point in the control cycle the output 178 is connected by relay 196 to the windings of the stator 74, and the resulting electromagnetic coupling produces a slow rotation of the output shaft, so that the vehicle will creep forward at engine idling speed.

When the pedal 130 is depressed, the voltages of signals 188C and 188A will increase, raising the voltage at the summing rail output 174. This increases the coupling against the stator, producing more power at the output shaft 118. As the vehicle accelerates the voltage from 188B increases the output 174, and hence the coupling effect.

When the voltage at 188B is equal to or higher than one-third of the voltage from 188A, the relay switches the PWM output to the positive side of the rotor brush pair. The stator 74 is now effectively disconnected and the inner rotor 122 coupled to the armature rotor 110, allowing the speed of the shaft 118 to rise to almost engine speed. The more power demanded from the pedal 130, the greater the signal 178, and hence the coupling power. With increase in vehicle speed, the signals 188A to 188C combine to produce a stiffer coupling with the armature rotor 110, with maximum coupling being achieved nearer the peak of the engine power curve.

Any slippage between the armature rotor 110 and either the stator 74 or, in the second transmission mode, with the rotor 122 produces regenerative power which is rectified by the 3-phase bridge rectifier 180 mounted on the casing of the armature rotor. The output is connected to the sliprings 162 and 182, the output from the latter being connected to the input 182. When the voltage of 182 exceeds battery voltage and the forward voltage drop of the two further rectifiers 198 (FIG. 9), then current will flow into the battery 128. However if the battery voltage is above, say, 14.2V the relay 184 will switch the output 186 to the cicuit of FIG. 7. This fedback control to output 178 increases the coupling with the stator or rotor, which reduces the slippage and hence the regenerative output at 182.

Though not shown, the stator may also be provided with winding from which power can be extracted when slippage take place between the stator and the rotor 110.

When the pedal 130 is released, causing the vehicle to decelerate, the reduction in the voltages 188C and 188A on the summing rail output 174 leaves the road speed of the vehicle to maintain signal 188B. This progressively reduces the output 174, and hence the coupling. If the brake pedal is then depressed, the voltage from the brake lights is connected to the input at 200 (FIG. 10), which lights the LED 192 and reduces the output voltage 174 to approximately 20% of its maximum. Steady engine braking can thus ensue, as the coupling is automatically reduced on application of the brake.

In the extreme case of an emergency stop, the application of the brake can be arranged to automatically close the switch 176, which immediately disconnects all power to the stator or rotor, placing the transmission in a freewheel condition.

Although the invention is above described in connection with a motor vehicle, it may equally be used in non-automotive applications. Thus, instead of having to use expensive invertors to vary the speed of an AC induction motor, the inventive apparatus can variably control a constant speed input with a simple feedback system to the PWM controller, to thereby produce any desired speed from zero to 1:1.

The apparatus could also be applied to variable speed inputs, eg gas turbine engines driving 400 Hz alternators in aircraft. Other applications could be for fixed voltage DC motors in electrical vehicles; or in marine applications using diesel or electric power.

I claim:

1. Variable transmission apparatus comprising a drive shaft and an output shaft, an outer rotor having a plurality of axial slots in which are formed electric conductor means, an inner rotor mounted within the outer rotor and having windings to which an adjustable electric power supply is connectable so that the the two rotors are in electromagnetic cooperation, the drive shaft being connected to one of the rotors, and epicyclic gear means including a planet carrier and annulus and sun gears for mechanically connecting the rotors in such a manner that when in use electric power is supplied to the windings of the inner rotor, the resulting torque between the rotors is transmitted via the gear means to the output shaft, whereby increasing the electric power to the inner rotor increases said torque and enables the speed of the output shaft to be increased.

2. Apparatus according to claim 1 in which the output shaft is connected to the planet carrier.

3. Apparatus according to claim 1 in which the conductor means comprises windings in which electric power is generated when in use slippage takes place between the rotors, and means for extracting said power.

4. Apparatus according to claim 3 in which said power is utilised for ancilliary purposes including for said adjustable supply and/or for charging a battery.

5. Apparatus according to claim 1 in which the adjustable supply to the inner rotor is a DC supply provided by a pulse width modulation circuit.

6. Apparatus according to claim 1 in which the inner and outer rotors are connected respectively to the sun and annulus gears, while the output shaft is connected to the planet carrier.

7. Apparatus according to claim 1 in which the drive shaft is connected to the outer rotor.

8. Apparatus according to claim 1 in which the drive shaft is connected to the inner rotor.

9. Apparatus according to claim 8 further comprising a stator mounted around the outer rotor and having pole pieces engageable electromagnetically with the outer rotor, and means for energising the pole pieces when said adjustable supply to the inner rotor is disconnected.

10. Apparatus according to claim 9 further comprising windings formed in the stator in which in use electric power is generated when slippage takes place between the outer rotor and the stator.

11. Apparatus according to claim 3 in which the windings in said slots are 3-phase windings connectable to a slip ring assembly, whereby electrical power generated by slippage between the rotors can be drawn off.

12. Apparatus according to claim 1 in which the outer rotor is provided with axially extending ventilation passages.

13. Apparatus according to claim 11 further comprising tubes extend outwardly from the ends of said passages to thereby form a centrifugal fan for drawing cooling air through the passages.

14. Apparatus according to claim 1 in which the inner rotor has alternator type windings and is formed with a plurality of pairs of poles, in particular three pairs.

* * * * *